US009886701B1

(12) United States Patent
Llora et al.

(10) Patent No.: US 9,886,701 B1
(45) Date of Patent: Feb. 6, 2018

(54) ENDORSEMENT ABUSE DETECTION VIA SOCIAL INTERACTIONS

(71) Applicant: GOOGLE INC., Mountain View, CA (US)

(72) Inventors: Xavier Llora, Mountain View, CA (US); Andrew Beckmann Sellergren, San Francisco, CA (US); Morgan Avery Conbere, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 552 days.

(21) Appl. No.: 14/099,825

(22) Filed: Dec. 6, 2013

(51) Int. Cl.
*G06F 11/00* (2006.01)
*G06Q 30/02* (2012.01)
*G06F 21/55* (2013.01)

(52) U.S. Cl.
CPC ....... *G06Q 30/0248* (2013.01); *G06F 21/554* (2013.01)

(58) Field of Classification Search
CPC . G06Q 30/0185; G06Q 30/02; G06Q 30/0225
USPC ................ 705/14.1, 14; 726/23, 22, 24, 25; 709/223, 224
See application file for complete search history.

(56) References Cited

U.S. PATENT DOCUMENTS

| 8,135,615 | B2 * | 3/2012 | Bradley | G06Q 30/0185 |
| | | | | 705/14.47 |
| 2012/0259753 | A1 * | 10/2012 | Orad | G06Q 40/00 |
| | | | | 705/35 |

* cited by examiner

*Primary Examiner* — Luis A Brown
(74) *Attorney, Agent, or Firm* — Procopio, Cory, Hargreaves & Savitch LLP

(57) ABSTRACT

Endorsement abuse detection via social interactions is described, including generating an endorsement log comprising an endorser identifier, a target identifier, endorsement data, and a token indicative of an endorsement event; analyzing the endorsement log with respect to a user aggregator and a target aggregator, to generate an online endorsement abuse candidate; generating an endorsement overlap graph for the online endorsement abuse candidate based on the endorsement log, the user aggregator and the target aggregator, wherein nodes of the endorsement overlap graph represent ones of the online endorsement abuse candidate, and edges represent a number of shared endorsements; and determining whether the endorsement event is authorized based an analysis of the endorsement overlap graph and an orthogonal signal at least one of transmitted and received by the ones of the online endorsement abuse candidate.

12 Claims, 8 Drawing Sheets

ENDORSEMENT ABUSE DETECTION VIA SOCIAL INTERACTIONS

BACKGROUND

An online user may provide an endorsement. For example, a user may provide a recommendation, rating, review, content or other online content indicative of a positive or negative endorsement. Such endorsements by an online user may provide great value for a target (e.g., URL) that is being endorsed.

However, online endorsements may be abused. For example, unauthorized endorsements may be offered for sale by an unauthorized party, and may be purchased by a potential target of an endorsement. Such a purchase and display of online endorsements may result in a distorted recommendation profile for the potential target with respect to other similarly situated targets (e.g., URLs of competitors).

The mechanism by which such online endorsement abuse may occur includes the sale of recommendations, or the exchange of recommendations. However, these mechanisms as performed by the unauthorized party may be difficult to identify and stop. Additionally, signal analysis may be difficult, due to possible masking or forgery of signals by the unauthorized party, as well as latency issues, due to the possible transient nature of the unauthorized party.

SUMMARY

The subject matter discussed herein relates generally to detection of online endorsement abuse by analysis of social interactions.

The subject matter may provide various advantages to users. For example, the endorsement overlap graph may result in increased efficiency and accuracy with respect to detection of organized abuse. Further, there may be a positive effect on speed of automation as well as quality of enforcement with respect to endorsement abuse. Additionally, due to the generic nature of the approach, the subject matter is independent of the type of endorsement, and can be used for various types of endorsements.

The subject matter includes generating an endorsement log comprising an endorser identifier, a target identifier, endorsement data, and a token indicative of an endorsement event; analyzing the endorsement log with respect to a user aggregator and a target aggregator, to generate an online endorsement abuse candidate; generating an endorsement overlap graph for the online endorsement abuse candidate based on the endorsement log, the user aggregator and the target aggregator, wherein nodes of the endorsement overlap graph represent ones of the online endorsement abuse candidate, and edges represent a number of shared endorsements; and determining whether the endorsement event is authorized based an analysis of the endorsement overlap graph and an orthogonal signal, which is at least one of transmitted and received by the ones of the online endorsement abuse candidate.

In some example implementations, an action is taken in response to a determination that the endorsement event is not authorized.

In other example implementations, the pipeline performs the processing by accessing at least one of incremental data and time series data associated with historical online endorsement abuse events.

In yet other example implementations, the generating the endorsement log comprises receiving an endorsement request from the endorser identifier; generating, encoding and encrypting a signal, including the token, in response to the endorsement request; transmitting the signal and an endorsement object to the endorser identifier; in response to an endorsement action by the endorsement identifier, providing an indication of endorsement and passing the endorsement action and the token from the endorser identifier to the server.

In still other example implementations, the determining comprises extracting at least one sub-graph of the endorsement overlap graph having a density above a threshold; applying the orthogonal signal to filter the extracted sub-graphs; and at least one of applying a rule base and a neural network to the extracted, filtered sub-graphs.

In further example implementations, the analyzing the endorsement log further comprises comparing the endorser identifier against a list of confirmed endorsement abuse identifiers, and taking an action.

In still further example implementations, the analyzing the endorsement log comprises determining that the endorsement identifier is the online endorsement abuse candidate when at least one abuse metric is triggered.

In addition to a method as described above, the implementations may include a system or a computer-readable medium, but are not limited thereto.

DETAILED DESCRIPTION

The subject matter described herein is taught by way of example implementations. Various details have been omitted for the sake of clarity and to avoid obscuring the subject matter. The examples shown below are directed to structures and functions for implementing endorsement abuse detection.

An example implementation is directed to identification of the unauthorized parties that may attempt to disguise themselves when engaging in unauthorized online endorsements. Because online endorsement takes the form of an online user interacting with respect to a specific target, the online endorsement generates a clear trace linking the online user and the target of the endorsement. Rather than focusing on the content, the example implementation detects abuse of endorsements by modeling user behavior. By focusing on the behavior rather than the content, the example implementation focuses on the origination of the online user making the endorsement, the manner in which the online user interacts with the target, and determining whether the online user is an unauthorized party.

Accordingly, the example implementation considers that the likelihood of two users of a common set of targets may be a clear signal of abuse. This consideration is extended to all possible user pairs, such that an endorsement overlap graph is generated, where nodes represent users, and edges are weighted based on a number of shared endorsements. High density sub-graphs are extracted from the endorsement overlap graph, and further filtered using orthogonal abuse signals. For example, the orthogonal abuse signal may include, but is not limited to, a signal that includes an source internet protocol (IP) address of the unauthorized party.

Figure 1:
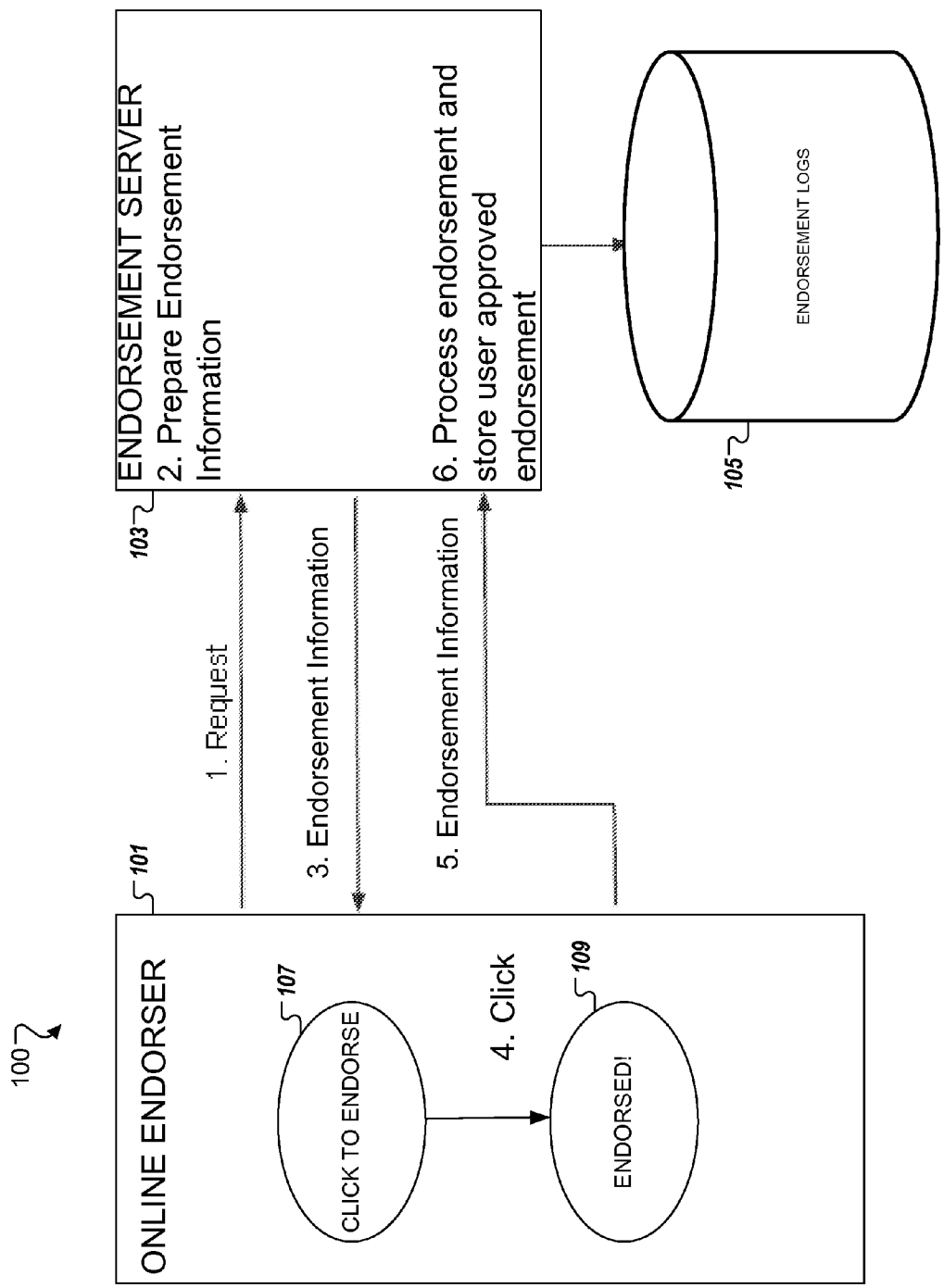
FIG. 1 illustrates an example mechanism for receiving endorsements.

FIG. 1 illustrates an example mechanism for receiving endorsements. Endorsements are expected to be received from users endorsing targets (e.g., issuing "+1", reviewing, commenting, voting, etc. on webpages, content, images, audios, videos, documents, expressions, gestures, stars for store star ratings, etc.). To ensure endorsements are received from users endorsing via proper channels (e.g., valid endorsements), one or more mechanisms may be implemented to detect and discard invalid endorsements (e.g., endorsements automatically submitted by software and/or submitted in high-volume batches). An example mechanism may be implemented as in shown in environment 100.

This example shows an online endorser 101 (e.g., a webpage with a button for submitting an endorsement, such as a "+1", star rating or comment) and an endorsement server 103. The endorsement server 103 is communicatively coupled to endorsement log storage 105. In some example implementations, the endorsement server 103 and the endorsement logs 105 may be commonly coupled in a single hardware device.

The online endorser 101 may be, for example, a webpage showing an image, an audio, a video, a document, a literal expression, etc. (collectively referred to as content, which is being endorsed). Near the content (not shown) may be a target 107 (e.g., a button for submitting a "+1", star rating or an input box for receiving a comment) provided to endorse the content. When a user attempts to use target 107 to provide an endorsement, the target may automatically send a request to the endorsement server 103. For example, the request may be sent automatically when the user hovers a mouse pointer over a "+1" button (target 107). If target 107 is of another kind (e.g., a text box for input comment), as soon as the target is given focus by an operating system to receive the next input (e.g., a cursor is shown in the text box), it may trigger a request being sent to the endorsement server 103.

Upon receipt of the request, the endorsement server 103 prepares endorsement information (e.g., generates at least one token and performs encoding and encrypting or the token). The endorsement information is transmitted to the online endorser 101 to associate with the button (target 107). In some implementations, a button (e.g., data representing a button with a token) may be returned to be presented at the online endorser 101, along with the token that was generated by the endorsement server 103.

When the target 107 is clicked (e.g., by a user), an endorsement 109 is generated (e.g., data representing the click input and the token) and the endorsement information is transmitted to the endorsement server 103. Accordingly, the click is passed to the endorsement server 103, along with the token that was originally generated by the endorsement server 103. The endorsement server 103 processes (e.g., decrypts and decodes) the endorsement (e.g., click and token), and stores the user approved endorsement (e.g., a comment, a "+1", a star rating, etc.) to the endorsement logs 105.

Endorsements received by the endorsement server 103 without accompanying valid tokens may be ignored, discarded, or saved for further processing (e.g., to detect the originate information, etc.).

Figure 2:
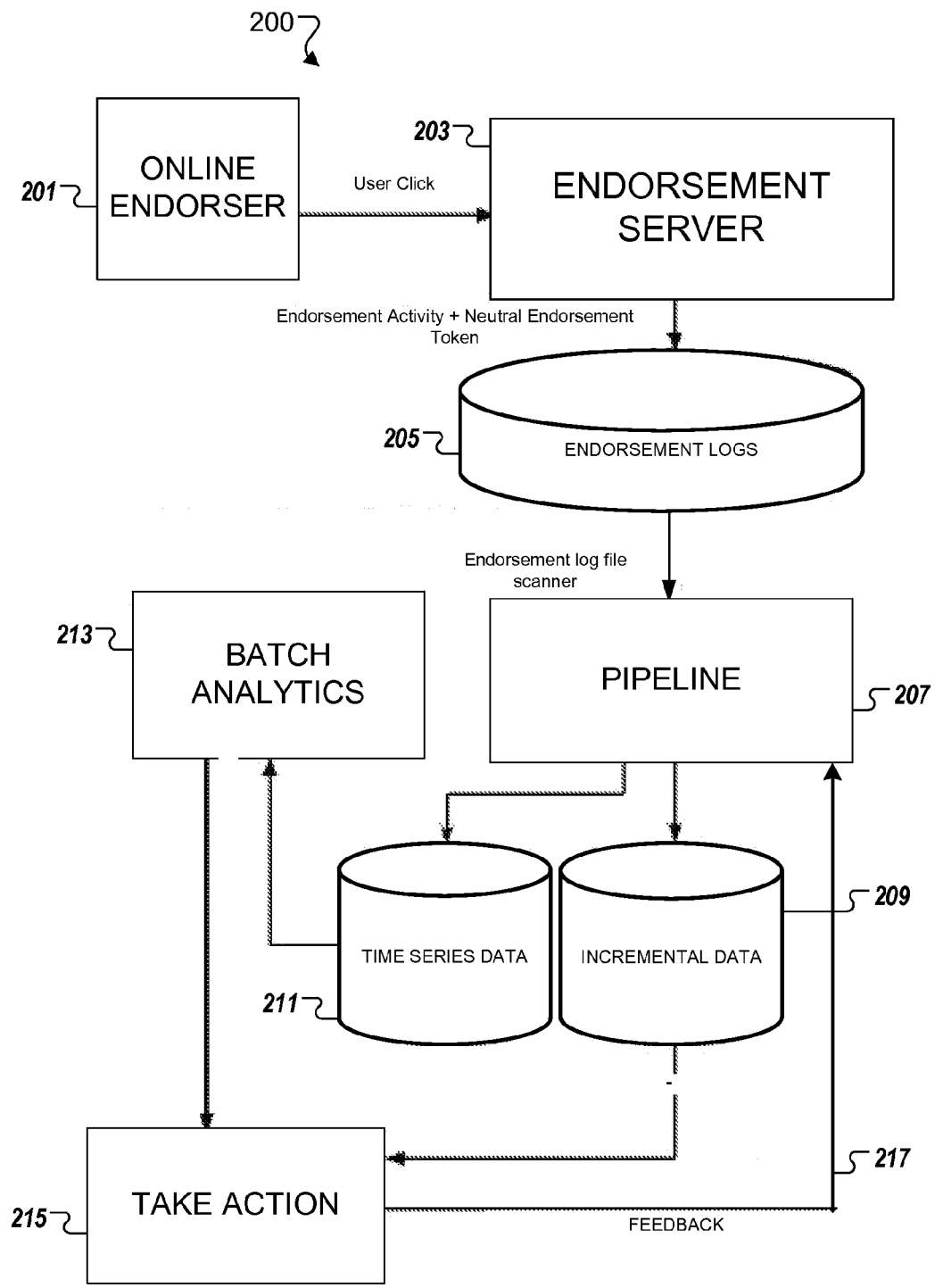
FIG. 2 illustrates a system diagram according to an example implementation.

FIG. 2 illustrates an example implementation of the online endorsement abuse detection scheme 200. An online endorser 201 outputs the endorsement via a user click, and this information is received at the endorsement server 203. According to the example implementation, an online user may interface with a browser to request an endorsement. The endorsement server 203 generates one or more signals, and encodes and encrypts a token.

As a result, the token is passed back to the browser, at the interface object, such as a button, which the online user may click. Once the online user has interfaced with the object, such as clicking the button to generate the endorsement, the click event and the token are passed back to the endorsement server 203. Further, the click event and token are decrypted and decoded, and the click event as well as the associated signals are logged.

The endorsement server 203 provides an output of the endorsement activity, along with a neutral endorsement service token, to endorsement logs 205. The neutral endorsement service token, which is also generated by the endorsement server 203, is applied in the abuse detection scheme as explained below.

An output of the endorsement logs 205 is transmitted to a pipeline 207. The pipeline 207 operates to process the endorsement log file received from the endorsement logs. Once the endorsement activity logging and the token have been provided, the logs are provided to the pipeline 207. The pipeline 207 performs an analysis of the activity of the user, for example, based on triggering of at least one abuse metric. For example, but not by way of limitation, the pipeline 207 may perform analysis of an abuse metric that may include one or more of volume, speed, acceleration, clustering or other measure of performance. To perform this analysis, the pipeline 207 draws from stored outcome information. This stored outcome information may include time series and other data, endorsements, users, and reasons for flagging.

More specifically, a username blacklist (e.g., immediate blocking action) or whitelist may be provided. Further, the activity is analyzed to determine if the online user is an unauthorized party. For example, if the speed of endorsements is too high, then it may be considered likely that the endorsements are not being made by a real online user. Further details of the pipeline 207 are discussed in greater detail below with respect to FIG. 5.

Figure 3A:
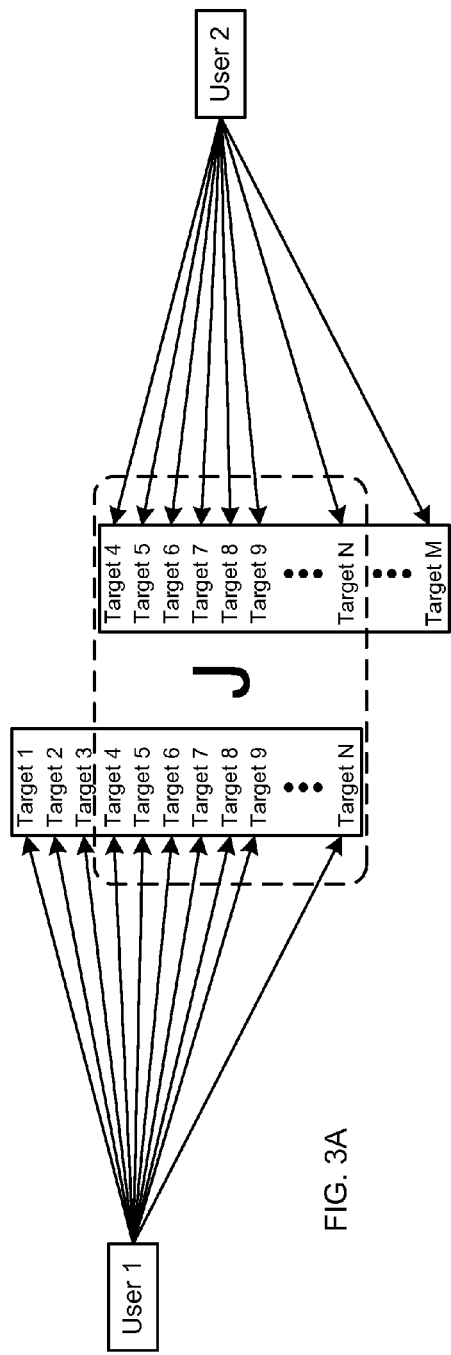
FIGS. 3A-B illustrate example shared targets between two users.
Figure 3B:
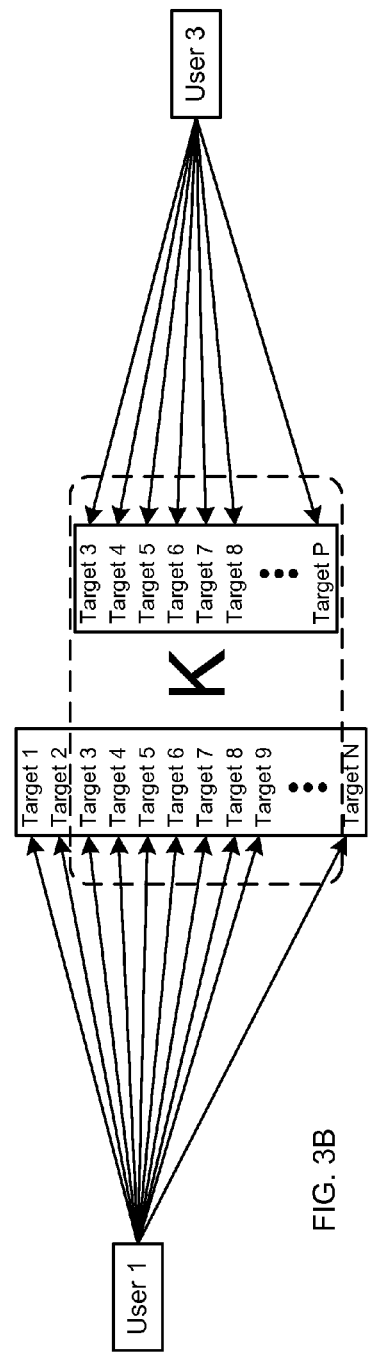

An output of the pipeline is received by incremental data 209, as well as time series data 211. The time series data 211 is used by batch analytics 213, to generate leads. For example, batch analytics 213 may determine shared targets between two users (as shown in FIGS. 3A and 3B) or among three or more users. The batch analytics 213 may further build user graphs, such as those shown in FIGS. 3C and 4. The outcome of the batch analysis is a determination as to whether the online endorsement is abuse, or is not abuse. If it is determined that the online endorsement is unauthorized, or abuse, action is taken, such as takedown of the endorsement or reference of the matter to an operator.

Thus, the leads are output as abuse candidates, and at 215, action is taken as needed. Additionally, incremental data 209 outputs leads and activity information to the take action function 215. The take action function 215 provides a feedback 217 to the pipeline 207.

FIGS. 3A-B illustrate example shared targets between two users. In FIG. 3A, User 1 is shown providing endorsements to N targets (e.g., providing N endorsements) and User 2 is shown providing endorsements to M-3 targets (e.g., providing M-3 endorsements). Among User 1's N endorsements and User 2's M-3 endorsement are J shared targets (i.e., User 1 and User 2 both have provided endorsements to the same J targets).

The batch analytics 213 (FIG. 2) may perform analysis similar to that shown in FIG. 3A for different pairs of users (e.g., for all combination of user pairs that satisfy certain one or more criteria, such as in a period of time). FIG. 3B shows that User 1 and User 3 have provided endorsement to the same K targets.

Figure 3C:
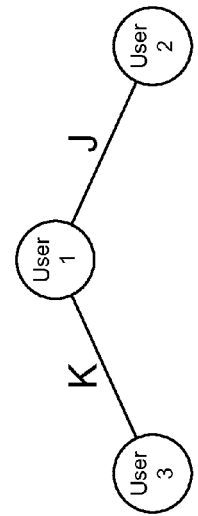
FIG. 3C illustrates an example graph generated based on FIGS. 3A-B.
Figure 4:
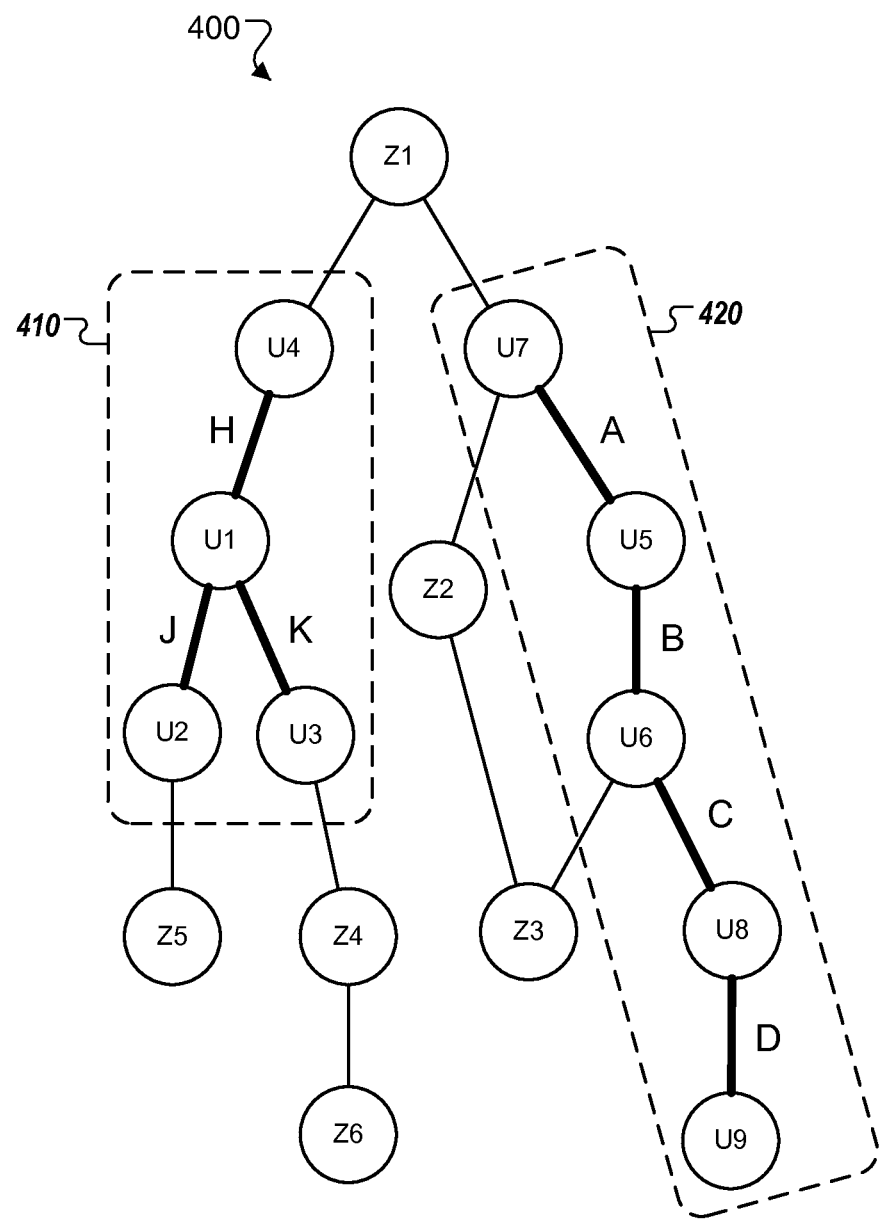
FIG. 4 illustrates another example graph generated based on shared targets between users.

Users with shared targets with be graphed as shown in FIGS. 3C and 4. FIG. 3C illustrates an example graph generated based on FIGS. 3A-B. Here, users are shown as nodes of a graph and shared targets between two users are shown as an edge between the two users. In some implementations, the edges of the graph may be weighted. For example, between User 1 and User 3 is shown an edge with a weight=K (FIG. 3B: User 1 and User 3 shared K targets). Between User 1 and User 2 is shown an edge with a weight=J (FIG. 3A: User 1 and User 2 shared J targets).

FIG. 4 illustrates another example graph generated based on shared targets between users. For example, graph 400 may be an extension of the graph of FIG. 3C, built with data of shared targets between more pairs of users. Graph 400 is illustrated with a certain number of users. In implemented analysis, a graph may have any number of users (e.g., 10's, 100's, 1000's . . . millions, and more users).

To detect invalid endorsers, weighted graphs may be processed to identify the weights of edges of the graphs and/or sub-graphs that meet or satisfy one or more criteria. A very simple example of a criterion may a threshold value. For example, based on experience and/or historical data gained from analyzing a representative sample of users, it may be shown that a "normal" range of shared targets between two users may be N1-N2. A threshold may be set above N2 (e.g., 10 times, 20 times, 50 times N2, etc.). Edges above the threshold are likely to show the adjacent nodes (e.g., users) being invalid endorsers. Thus, the endorsement from these users may be invalid and removed.

Other examples may involve additional and/or different factors or criteria (e.g., volume, speed, acceleration, etc. of endorsements).

In some implementations, tiers of detection may be implemented. For example, a first threshold value may be used to identify "questionable" endorsers that are to be further determined (e.g., by a second mechanism or human administrator). A second threshold value may be used to identify "likely" endorsers to be taken one or more actions. A third threshold value may be used to identify "sure" endorsers, whose endorsements are automatically taken down, and these endorsers may be added to a blacklist of endorsers, for immediate blocking action.

Graph 400 is shown with two clusters 410 and 420 of users that are connected with edges with weights above some threshold value, for example, that indicates the users may be invalid endorsers (e.g., endorsers who provide invalid endorsements, such as endorsements that are for sale, that are exchanged for other values and/or services, etc.).

Cluster 410 includes users U1-U4, who are connected by edges weighted as J, K, and H (shown with dark lines to indicate that their weights are heavier than those edges shown with lighter lines). J, K, and H may meet one or more criteria (e.g., exceeding one or more threshold values).

Similarly, cluster 420 includes users U5-U9, who are connected by edges weighted as A, B, C, and D that may meet one or more criteria (e.g., exceeding one or more threshold values). Based at least on the weighted edges, users in clusters 410 and 420 may be identified and/or provided in reports and/or alerts. In some implementations, one or more actions may be taken, such as removing endorsements from these users, deactivating or deleting the accounts of these users, and/or other possible actions suitable for handling invalid endorsers and/or invalid endorsements.

Analysis and/or generation of the shared targets and graphs shown in FIGS. 3A-4 may be performed by the pipeline 207 and/or batch analytics 213 (FIG. 2). Pipeline 207 (described further below as pipeline 500) may use graphs (e.g., shown in FIGS. 3C and 4) in analyzing and detecting invalid endorsers. In some implementations, additional analysis and detections may be performed by batch analytics 213 (FIG. 2) after the analysis and detections by the pipeline 207 (pipeline 500).

Figure 5:
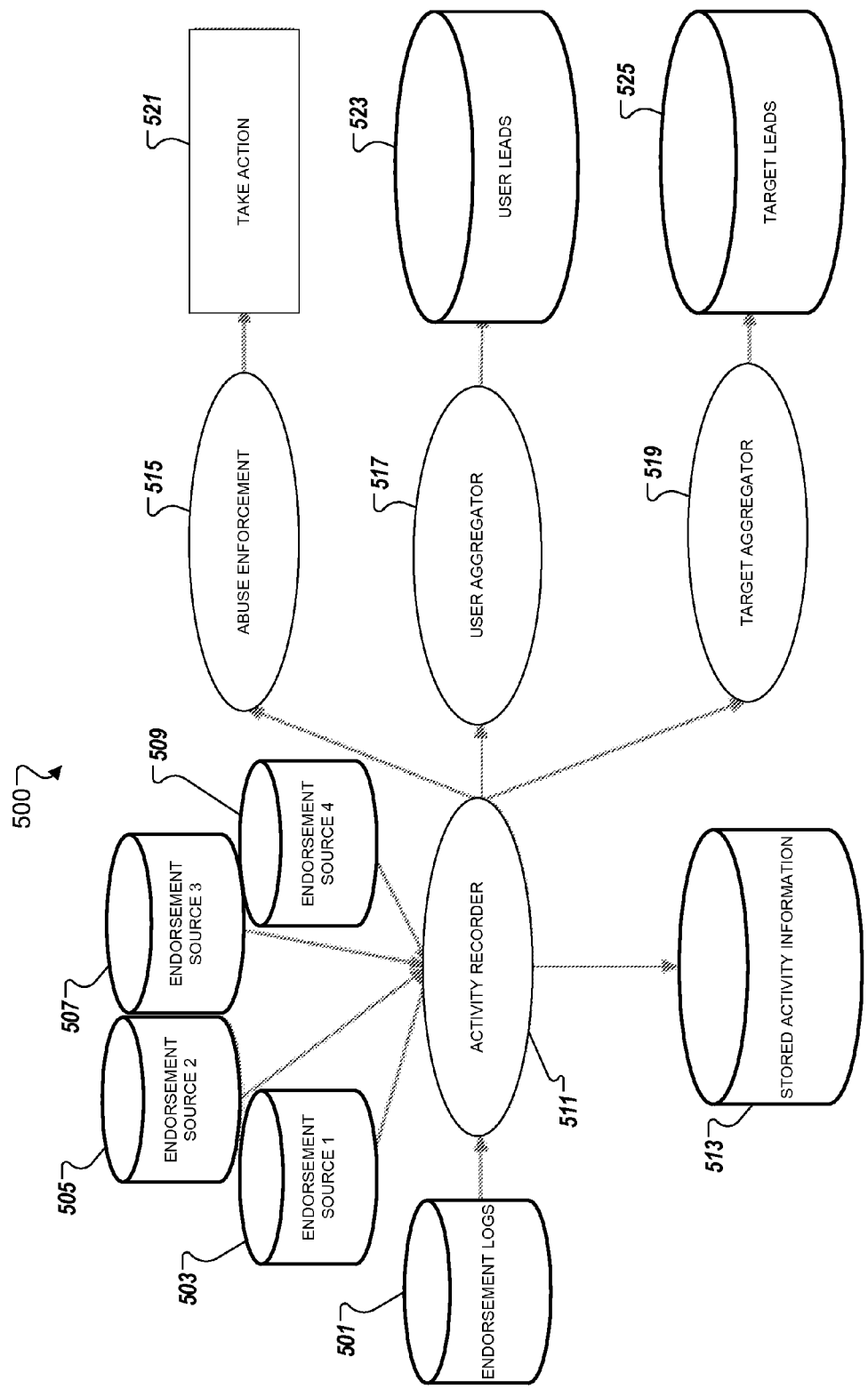
FIG. 5 illustrates the pipeline of the system according to an example implementation.

FIG. 5 illustrates a pipeline 500 of the system according to an example implementation. The context of the pipeline 500 is explained above with respect to element 207 of FIG. 2.

As shown in FIG. 5, the endorsement logs 501 are output to an activity recorder 511. The activity recorder 511 receives not only information from the endorsement logs 501, but also receives input from endorsement sources 1 . . . . 4, enumerated as reference numerals 503, 505, 507 and 509, respectively. The foregoing information as recorded by the activity recorder 511 is stored at stored activity information 513. The activity recorder 511 outputs the stored information to at least 3 destinations.

Abuse enforcement 515 is provided (e.g., abuse enforcement logic such as a blacklist extractor), such that if the information in an endorsement log is associated with a blacklisted value, it can be determined that the endorsement is not authorized. Accordingly, these endorsement logs would be indicative of abuse, and immediate blocking action would be taken at operation 521.

A user aggregator 517 is provided. The user aggregator 517 collects user information from the activity recorder 511, and outputs user leads at user leads 523.

A target aggregator 519 outputs target leads at target leads 525. The output of the pipeline 500 is provided to incremental data 209 and time series data 211, which operate and are structured as explained above with respect to FIG. 2.

More specifically, the pipeline 500 includes the activity recorder 511 that receives the logs 501 for various types of endorsements. By accessing the various types of endorsements, including mobile 503, metadata 505, e-mail 507 and other 509, the activity recorder 511 can identify a type of the recommendation, and convert the signals from the logs into a common unified format. The data having the common data format is then subjected to abuse enforcement 515, such as abuse enforcement logic including a blacklist extractor, which determines whether a user associated with the endorsement is on a blacklist (e.g., a list for immediate blocking action), a user aggregator and a target aggregator, each of which considers relative speed of a plurality of endorsements.

The pipeline analysis generates a result indicative of endorsement abuse. If the result indicates that the likelihood of abuse is below a threshold, the process terminates. However, if the result indicates that the likelihood of abuse is greater than or equal to a threshold, then batch analytics are performed. More specifically, the user aggregator 517 and the target aggregator 519 of the pipeline stream data to the batch analytics 213.

The endorsement overlap graph is thus generated, as well as high density sub-graphs, as explained above. Components are identified, and metrics of the endorsement overlap graph are analyzed.

Further, extra signals, such as the orthogonal signals, are used in the analysis as a filter. The analysis may include an intelligent process such as a rule-based system, a neural network, or other intelligent process. An outcome is generated based on the results of the analysis.

Figure 6:
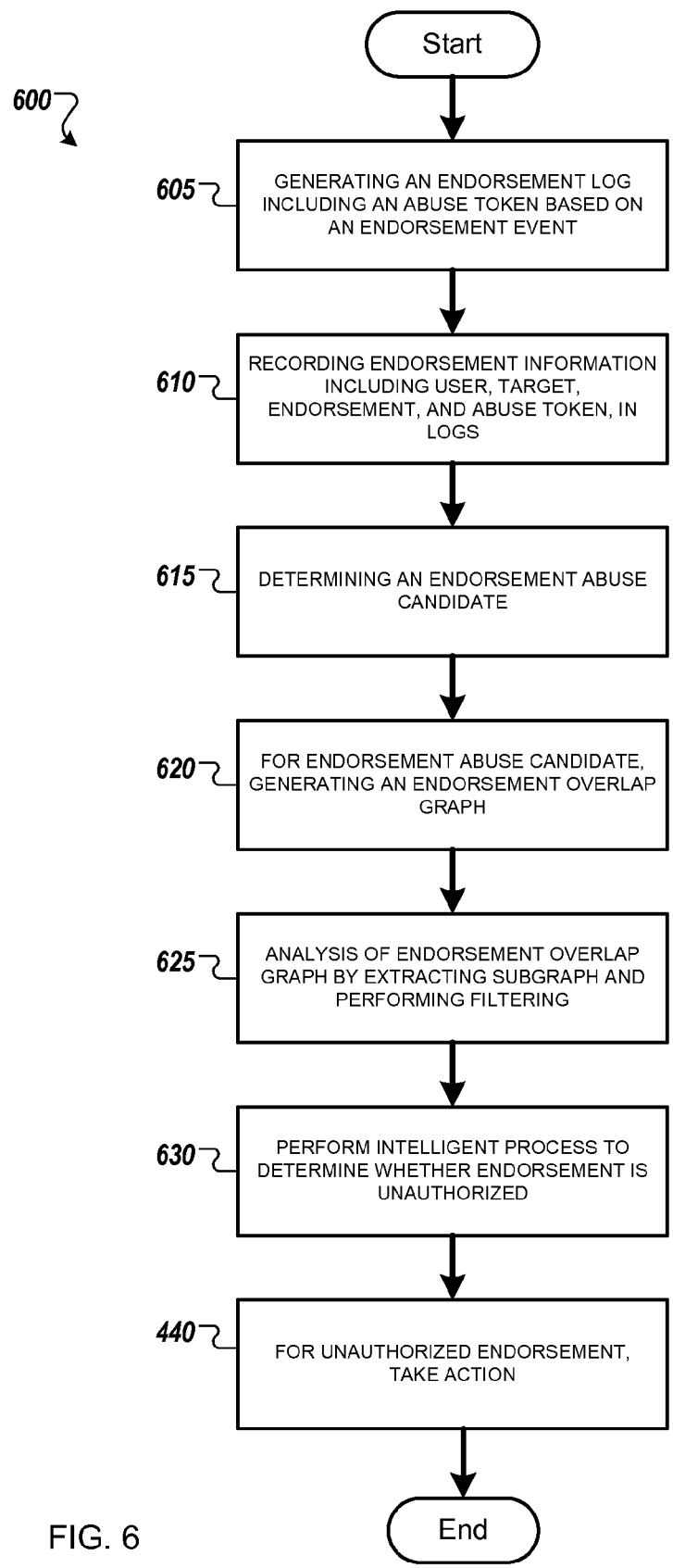
FIG. 6 illustrates an example process according to an example embodiment.

FIG. 6 illustrates an example process implementation. In the process 600, at 605, and endorsement log is generated, including a neutral endorsement service token that is based on an endorsement event. Further explanation of endorsement events is discussed above with respect to FIG. 1.

Once the endorsement event and the neutral endorsement service token have been generated, the endorsement information is recorded at 610. More specifically the endorsement information includes, but is not limited to, information about the user, target, and endorsement. Further, the neutral endorsement service token is also recorded in the endorsement information. The recording at 610 occurs in the logs, which are described above.

At 615, an endorsement abuse candidate is determined. The determination of the endorsement abuse candidate is described above in detail with respect to FIGS. 2-5.

At 620, for each endorsement abuse candidate that has been determined at 615, an endorsement overlap graph is generated. The generation of the endorsement overlap graph is discussed above with respect to FIGS. 2-5.

At 625, the endorsement overlap graph is analyzed, by extracting one or more sub-graphs, and performing filtering. The extraction and filtering is discussed above with respect to FIGS. 2-5.

At 630, an intelligent process is performed, to determine whether or not the endorsement is unauthorized.

At 640, for the case of an unauthorized endorsement, action is taken, as explained above.

Figure 7:
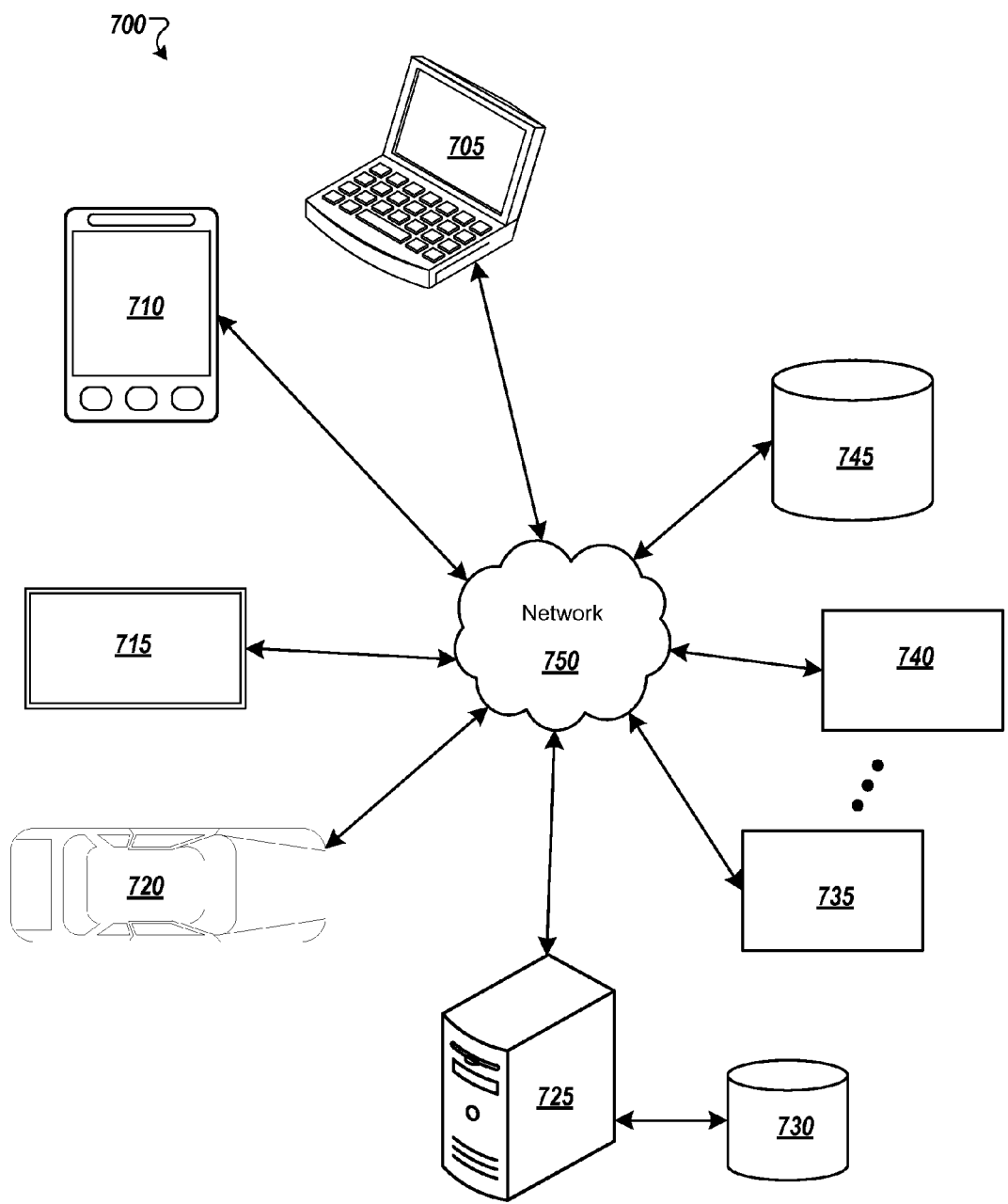
FIG. 7 illustrates an example online environment suitable for some example implementations.

FIG. 7 shows an example online environment in some example implementations. Environment 700 includes devices 705-745, and each is communicatively connected to at least one other device via, for example, network 760 (e.g., by wired and/or wireless connections). Some devices may be communicatively connected to one or more storage devices 730 and 745.

An example of one or more devices 705-745 may be computing device 805 described below in FIG. 8. Devices 705-745 may include, but are not limited to, a computer 705 (e.g., a laptop computing device), a mobile device 710 (e.g., smartphone or tablet), a television 715 with one or more processors embedded therein and/or coupled thereto, a device associated with a vehicle 720, a server computer 725, computing devices 735-740, and storage devices 730 and 745.

In some implementations, devices 705-720 may be considered user devices (e.g., devices used by users to access services and/or issue requests (e.g., requests to endorse). Devices 725-745 may be devices associated with service providers (e.g., used by service providers to detect unauthorized endorsement activity).

For example, a user may issue an endorsement request from user device 705 or 710. The request is received by device 725 (e.g., a server of a service provider). For example, the request may be for providing an endorsement that is associated with content. The data associated with the endorsement request may be stored in device 730 and/or 745. In response to the endorsement request, device 725, which may include logic to perform the operations associated with detecting unauthorized endorsement activity, encrypts a signal generated by the user, and includes a token. Once the endorsement has been requested, the token is passed back to device 725, and further operations as illustrated in FIG. 6 and described above may be performed.

Figure 8:
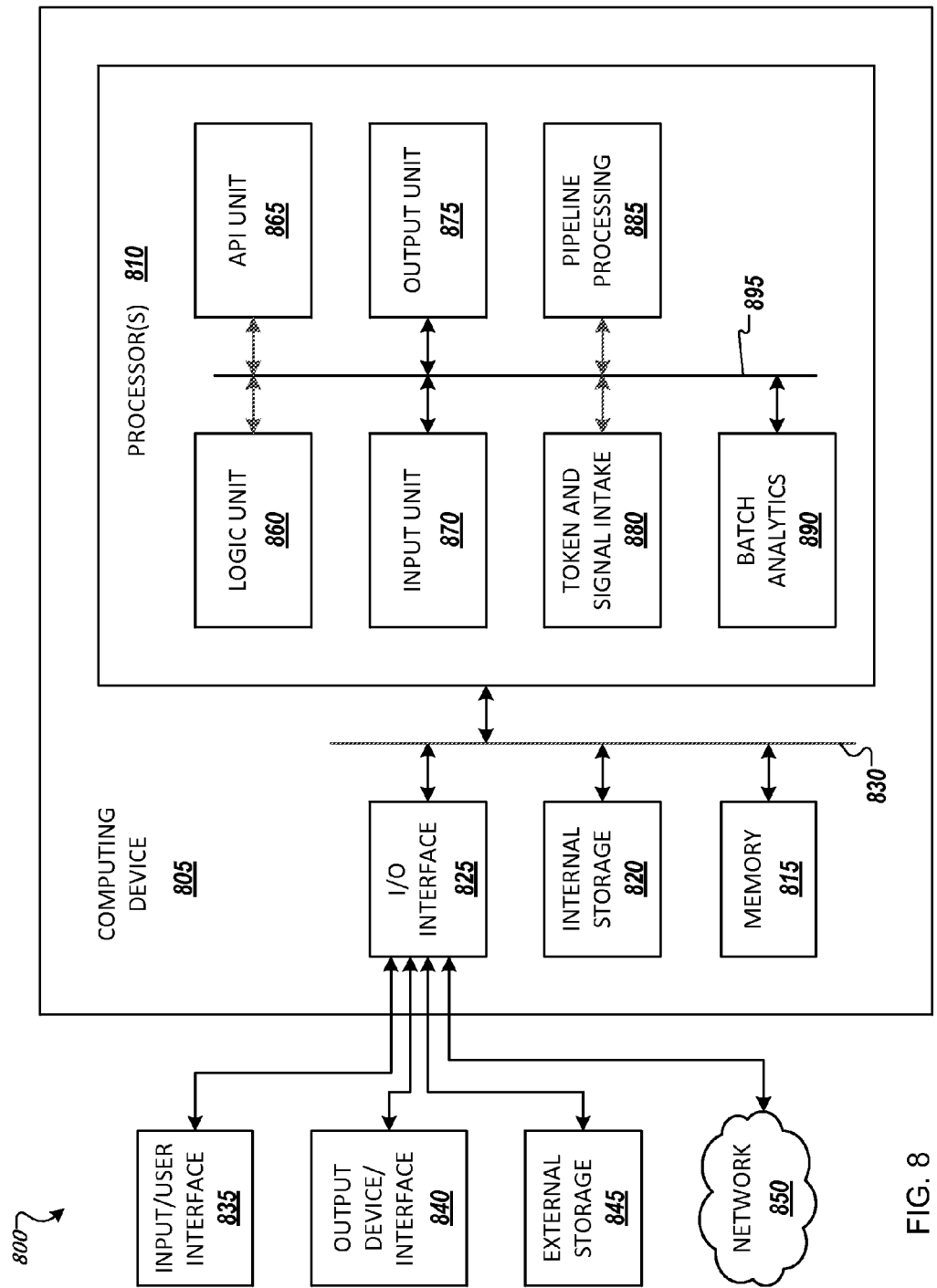
FIG. 8 shows an example computing environment with an example computing device suitable for implementing at least one example implementation.

FIG. 8 shows an example computing environment with an example computing device suitable for some example implementations. Computing device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computing device 805.

Computing device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example implementations, input/user interface 835 and output device/interface 840 can be embedded with or physically coupled to the computing device 805. In example implementations, other computing devices may function as or provide the functions of input/user interface 835 and output device/interface 840 for a computing device 805.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 805 can be communicatively coupled (e.g., via I/O interface 825) to external storage 845 and network 850 for communicating with any number of networked components, devices, and systems, including one or more computing devices of the same or different configuration. Computing device 805 or any connected computing device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computing device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 860, application programming interface (API) unit 865, input unit 870, output unit 875, token and signal intake 880, pipeline processing 885 and batch analytics 890 for the different units to communicate with each other, with the OS, and with other applications (not shown). For example, token and signal intake 880, pipeline processing 885 and batch analytics 890 may implement one or more processes described and/or shown in FIGS. 1-7. The described units and elements can be varied in design, function, configuration, or implementation and are not limited to the descriptions provided.

In some example implementations, when information or an execution instruction is received by API unit 865, it may be communicated to one or more other units (e.g., logic unit 860, input unit 870, output unit 875, token and signal intake 880, pipeline processing 885 and batch analytics 890). For example, token and signal intake 880 may provide an endorsement object for a user, and an action for a user to endorse, which is received by input unit 870 and forwarded to pipeline processing 885 via API unit 865. Pipeline processing 885 performs data processing operations on the user endorsement and an associated token, and communicates with batch analytics 890 to generate a result (e.g., take action, user leads, target leads).

In some example implementations, logic unit 860 may be configured to control the information flow among the units and direct the services provided by API unit 865, input unit 870, output unit 875, token and signal intake 880, pipeline processing 885 and batch analytics 890. For example, the flow of one or more processes or implementations may be controlled by logic unit 860 alone or in conjunction with API unit 865.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method, comprising:
    based on an attempt by an online endorser to generate an endorsement at a target, receiving a request for a token;
    in response to the request, generating the token, and providing the target with an encrypted version of the token;
    receiving the encrypted version of the token and an endorsement action from the target;
    generating an endorsement log comprising an endorser identifier, a target identifier, endorsement data, and the token indicative of the endorsement event, wherein the generating the endorsement log comprises:
        receiving the request for the token from the endorser identifier;
        generating, encoding and encrypting a signal, including the token, in response to the request;
        transmitting the signal and an endorsement object to the endorser identifier; and
        in response to an endorsement action by the endorsement identifier that occurs after the attempt, providing an indication of endorsement and passing the endorsement action and the token from the endorser identifier to the server;
    analyzing the endorsement log with respect to a user aggregator and a target aggregator, to generate an online endorsement abuse candidate associated with endorsement abuse, wherein the endorsement abuse comprises an endorsement that identifies an online user as a source of the endorsement, without authorization by the online user;
    generating an endorsement overlap graph for the online endorsement abuse candidate based on the endorsement log, the user aggregator and the target aggregator, wherein nodes of the endorsement overlap graph represent ones of the online endorsement abuse candidate, and edges represent a number of shared endorsements; and
    determining whether the endorsement event is authorized based an analysis of the endorsement overlap graph and an orthogonal signal at least one of transmitted and received by the ones of the online endorsement abuse candidate.

2. The computer-implemented method of claim 1, further comprising taking an action in response to a determination that the endorsement event is not authorized.

3. The computer-implemented method of claim 1, wherein a pipeline performs the analyzing by accessing at least one of incremental data and time series data associated with historical online endorsement abuse events.

4. The computer-implemented method of claim 1, wherein the determining comprises:
   extracting at least one sub-graph of the endorsement overlap graph having a density above a threshold;
   applying the orthogonal signal to filter the extracted sub-graph; and
   applying at least one of a rule base and a neural network to the extracted, filtered sub-graph.

5. The computer-implemented method of claim 1, wherein the analyzing the endorsement log further comprises comparing the endorser identifier against a list of confirmed endorsement abuse identifiers, and taking an action.

6. The computer-implemented method of claim 1, wherein the analyzing the endorsement log comprises determining that the endorser identifier is the online endorsement abuse candidate when at least one abuse metric is triggered.

7. An apparatus comprising a processor, the apparatus configured to perform functions of:
   a token and signal intake that generates an endorsement log comprising an endorser identifier, a target identifier, endorsement data, and a token indicative of an endorsement event, wherein based on a request indicative of an attempt by an online endorser to generate an endorsement, the token is provided in an encrypted format to a target, and is returned from the target in response to an endorsement action at the target;
   a pipeline processing unit that analyzes the endorsement log with respect to a user aggregator and a target aggregator, to generate an online endorsement abuse candidate associated with endorsement abuse, wherein the endorsement abuse comprises an endorsement that identifies an online user as a source of the endorsement, without authorization by the online user; and
   a batch analytics unit that generates an endorsement overlap graph for the online endorsement abuse candidate based on the endorsement log, the user aggregator and the target aggregator, wherein nodes of the endorsement overlap graph represent ones of the online endorsement abuse candidate, and edges represent a number of shared endorsements, wherein the batch analytics unit is to generates the endorsement log by;
   receiving the request for the token from the endorser identifier;
   generating, encoding and encrypting a signal, including the token, in response to the request;
   transmitting the signal and an endorsement object to the endorser identifier; and
   in response to an endorsement action by the endorsement identifier that occurs after the attempt, providing an indication of endorsement and passing the endorsement action and the token from the endorser identifier to the server; and
   wherein an analysis of the endorsement overlap graph and an orthogonal signal at least one of transmitted and received by the ones of the online endorsement abuse candidate is applied to determine whether the endorsement event is authorized.

8. The apparatus of claim 7, wherein an action is taken in response to a determination that the endorsement event is not authorized.

9. The apparatus of claim 7, wherein the pipeline processing unit performs the processing by accessing at least one of incremental data and time series data associated with historical online endorsement abuse events.

10. The apparatus of claim 7, wherein determining whether the endorsement is authorized comprises:
    extracting at least one sub-graph of the endorsement overlap graph having a density above a threshold;
    applying the orthogonal signal to filter the extracted sub-graph; and
    applying at least one of a rule base and a neural network to the extracted, filtered sub-graph.

11. The apparatus of claim 7, wherein the pipeline processing unit analyzing the endorsement log further comprises comparing the endorser identifier against a list of confirmed endorsement abuse identifiers, and taking an action.

12. The apparatus of claim 7, wherein the analyzing the endorsement log comprises determining that the endorsement identifier is the online endorsement abuse candidate when at least one abuse metric is triggered.

* * * * *